Nov. 11, 1952     M. H. HAMILTON     2,617,535
FILTER UNIT
Filed Nov. 5, 1948
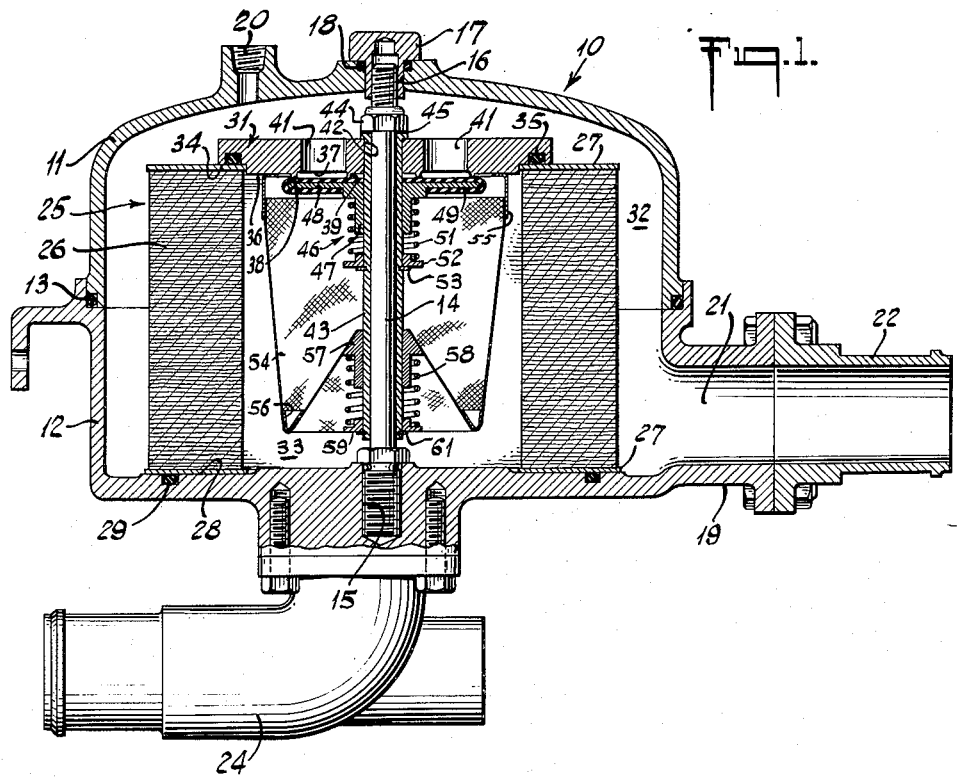
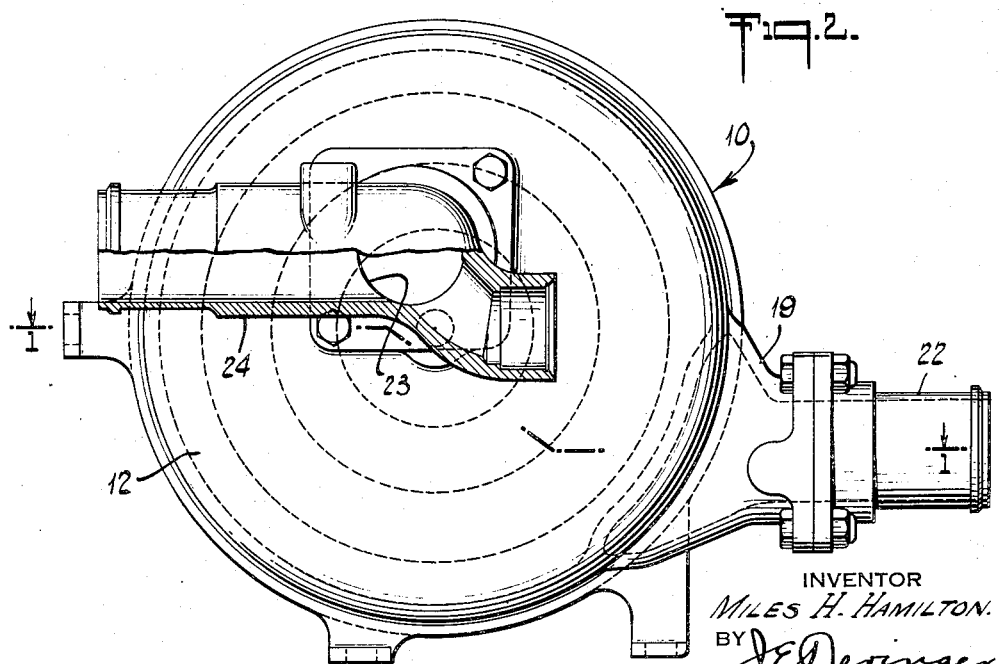
INVENTOR
MILES H. HAMILTON.
BY J. E. Deringer
HIS ATTORNEY Patented Nov. 11, 1952

2,617,535

UNITED STATES PATENT OFFICE 2,617,535

FILTER UNIT

Miles H. Hamilton, Los Angeles, Calif., assignor to United Aircraft Products, Inc., Dayton, Ohio, a corporation of Ohio Application November 5, 1948, Serial No. 58,519

5 Claims. (Cl. 210—166)

This invention relates to filter units of the kind utilizing a replaceable filter element for removing sediment and other foreign material from a fluid flowing under pressure.

The invention has particular, although not limited, reference to filter units as used in the fuel supply lines of aircraft engines. A high standard of performance is required of such devices. This fact, coupled with the need for quick and effective by-pass of a clogged filter and the desirability of obtaining lightness of weight predictably consistent performance and simplicity of assembly and disassembly has made fuel filters the subject of intensive design effort looking toward improvement in one or more of the above respects.

It is thought that the present invention achieves the design objectives more successfully and completely than was heretofore done. The realization of such purpose is, accordingly, the object of the invention.

In regard to the by-pass function it is contemplated by this invention to interpose a pressure relief valve in parallel with the filter in such wise that the valve will open under the application of a predetermined high pressure differential to the opposite sides thereof and permit the continuance of fluid flow in the system even though the filter has become clogged. In connection with the valve there is provided a novel seating arrangement therefor, obviating difficulties previously encountered resulting from frictional opposition to motion of the valve. The by-pass mechanism further comprises a screen in series with the valve and acting to remove a part of the foreign material in the by-passed fluid, a feature of the invention residing in a yielding mounting for the screen permitting a pressure relief motion thereof out of the path of fluid flow when the screen in turn becomes clogged.

A consistent performance of the by-pass means and simplicity of assembly of the unit is brought about by making the valve and screen and their associated parts a sub-assembly which may be installed in and removed from the filter housing as a unit, the several elements of the sub-assembly retaining their initial relation irrespective of other variable factors, such as the height or length of the filter.

In general it has been endeavored, with success, to present a filter unit of improved, simplified construction and operation, particularly qualified for use in the fuel supply lines of aircraft engines.

Other objects and other features of the invention will appear from the following description when read in connection with the accompanying drawing, wherein:

Fig. 1 is a view of a filter unit in accordance with the instant invention, the unit being shown in side elevation partly broken away along a longitudinal plane indicated by the section line 1—1 of Fig. 2, and Fig. 2 is a bottom view of the unit of Fig. 1.

Referring to the drawings, a filter unit comprises, in accordance with the present invention, a two part housing structure 10 made up of a pair of cup shaped elements 11 and 12 inversely disposed with respect to each other and with their edges in contacting relation. The contacting edges have an overlapping connection afforded by offset flanges thereon to confine therebetween a ring seal 13. Within the housing 10 and extending longitudinally between the elements 11 and 12 is a tie shaft 14. One end of the shaft 14 is anchored in the bottom of element 12 by a screw threaded reception in a tapped opening 15 therein. The opposite end of the tie shaft projects into an opening 16 in the dome of element 11 and has a screw threaded reception in the shank of a nut 17, the head of which overlies the outer surface of housing element 11. The shank of the nut 17 extends into the opening 16 in surrounding relation to the shaft 14 and is in turn surrounded by a ring seal 18 held in a counterbore in opening 16 by the head of the nut 17.

Housing element 12 is formed with a boss 19 defining an opening 21 communicating with the interior of housing 10. There may be secured to the boss 19, as shown, a connector 22 for the attachment of a fluid conducting pipe or hose line or the like, it being understood that the filter unit is designed for use in a system flowing fluid under pressure, for example the fuel supply line of an aircraft engine. Also communicating with the interior of the housing 10 is an opening 23 (Fig. 2) forming part of a fitting 24 adapted for connection in the fluid flowing system. The boss 19 defining opening 21 extends laterally from the side of housing element 12 while opening 23 and fitting 24 are at the bottom of element 12, the opening 23 being located in a position offset from the center line of the housing. In the installation of the filter unit, opening 21 is connected to the source of fuel supply and hence serves as the inlet of the unit, opening 23 serving as the outlet. In the dome of element 11 is a drain opening 20.

The tie shaft 14 lies approximately in the longitudinal axis of the housing 10. Within the housing, in spaced concentric relation to the tie shaft, is a cylindrical filter 25. The main body 26 of the filter is composed, as is customary, of a porous material such as loosely compacted paper. On the opposite ends of the body are relatively stiff rings 27. One end of the filter 25 rests upon the bottom of housing element 12, such bottom being formed with a flat seating surface 28. In the surface 28 is an annular groove receiving a sealing ring 29. The opposite end of the filter 25 is closed by a plate 31 resting thereon. Except for its contact with the bottom of element 12, the filter 25 lies in spaced relation to the inner walls of housing 10 and defines therewith a chamber 32 surrounding the filter. The chamber 32 is in open continuous communication with the inlet 21 and is supplied with fluid therefrom. In conjunction with the bottom of element 12 and plate 31, the filter 25 further defines an internal chamber 33 therein. The filter encloses that area of the housing in which outlet opening 23 is located so that chamber 33 is in continuous communication with the outlet. Accordingly, the normal path of flow of fluid through the unit is into the chamber 32 by way of inlet 21, through the porous body 26 of the filter 25 into the chamber 33 and out of the unit by way of outlet 23.

After a period of use, varying with the condition of the fluid in the system, the filter 25 will become clogged with particles and sediment removed from the fluid. The filter is inexpensive and may be replaced but it is desirable, particularly in aircraft fuel line installations, that the flow of fluid be not interrupted until such time as the clogged filter may be conveniently removed and replaced. To this end means are provided for directing the fluid from the inlet 21 to the outlet 23 in by-passing relation to the filter 25.

The plate 31 is formed on its underside and adjacent the periphery thereof with a stepped down ledge 34 resting on the upper ring 27 of the filter. Recessed within the ledge 34 is a ring seal 35 which, in conjunction with the ring seal 29 inhibits the flow of fluid around the filter into the chamber 33. Inwardly of the ledge 34, on the underside of plate 31, is an annular flat surface 36 while inwardly of the surface 36 is an annular groove 37. The area surrounded by groove 37 is recessed and the surface 36 outside the groove is stepped down to an extent approximately equal to the depth of the recess. Further, the central recessed portion and the surface 36 are radially spaced from the groove 37. Accordingly there is defined along the edges of the groove 37 projecting concentric rings 38 and 39. Opening into the groove 37 and extending longitudinally through the plate 31 is a series of ports 41 spaced in circular fashion about the axis of the plate.

Centrally of the ports 41 is an opening 42 in the plate 31 provided for the passage of the tie shaft 14 therethrough. The shaft 14 has mounted thereon a sleeve 43 having a close, substantially fluid tight fit in the opening 42. The sleeve 43 extends from a point adjacent the bottom of housing element 12 to a point just above the plate 31 where its upper or outer end is turned over upon the plate. A nut 44 is in threaded engagement with the outer end of the tie shaft 14, and, when turned down upon the end of sleeve 43, effectively locks the plate 31 in place upon the filter 25. A washer 45 between the nut 44 and sleeve 43 prevents fluid flow along the tie shaft 14 within the sleeve 43.

Surmounting the sleeve 43 within the chamber 33 and beneath the plate 31 is a valve 46 comprising a shank portion 47 having a sliding bearing on the sleeve 43 and a disc portion 48 underlying the concentric rings 38 and 39. The disc portion 48 of the valve is encased in a rubber or rubberlike sheath 49 providing a soft deformable surface insuring a fluid tight contact of the valve with the seat defined by rings 38 and 39. The valve 46 is urged to such seat by a coil spring 51 surrounding the shank 47 and based upon a retainer 52 which in turn limits upon a spring clip 53 set in the periphery of the sleeve 43. Thus, the valve 46 normally acts, under the urging of spring 51, to close the ports 41 and deny communication between the chambers 32 and 33 therethrough. The spring 51 will yield, however under the influence of a predetermined high pressure differential between the chambers 32 and 33, as may result from clogging of the filter 25. Accordingly, when that pressure differential is reached, valve 46 moves away from its seat on plate 31, opening ports 41 for direct flow from chamber 32 to chamber 33.

In surrounding relation to the tie shaft 14 and valve 46 is a screen 54 provided in order that there may be removed from the fluid by-passed through ports 41 some portion of the foreign material carried thereby. The screen 54 is sacklike in shape with the open or outer end thereof facing the plate 31. A reinforcement member 55 on the open end is turned inward and arranged to seat upon the annular flat surface 36 of plate 31. The bottom or closed end of the screen is also provided with a reinforcement member 56, the bottom being inverted from such member and attached to a bushing 57. The bushing 57 is slidably mounted on the sleeve 43 and rests upon a coil spring 58 interposed between the bushing and a retainer 59 limiting against a spring clip 61 set in the sleeve 43 adjacent the bottom thereof. The screen 54 has a substantially rigid shape, by reason of the reinforcement members 55 and 56, and is urged by the spring 58 upward or outward into contact with the plate 31. All the fluid entering chamber 33 by way of ports 41 is, therefore, normally compelled to pass through the screen 54.

The screen 54 may, like the filter 25, become clogged in use. When this occurs, the pressure differential between the inlet and outlet of the unit again will rise. Applied across the screen 54, a predetermined high pressure differential is effective to compress spring 58, allowing the screen to move downward or inward away from plate 31. The fluid may then flow around the upper end of the screen directly from the ports 41 to chamber 33 and the outlet.

Thus, in the operation of the unit, flow normally takes place into the chamber 32 by way of inlet 21 and through filter 25 to chamber 33 and the outlet 23. Valve 46 is closed at this time and no flow occurs through the ports 41. In the event of clogging of the filter 25, however, the ensuing increase in pressure drop between the inlet and outlet of the unit is effective to force valve 46 open against the resistance of spring 51. The fluid admitted to chamber 32 then may reach the outlet by passage in by-passing relation to the filter through the ports 41, the flow being strained by the screen 54 through which it is caused to pass. In the course of such by-passing flow, if the screen 54 in turn becomes clogged, spring 58 yields to the rising pressure differential and allows the screen to move away from its seat on plate 31 opening a path of direct flow between the inlet and outlet.

It will be apparent that the invention presents numerous features of advantage as compared to fuel filters of the prior art. Among these is the use of the spaced concentric rings 38 and 39 to define the seat for valve 46. Provision of the inner ring 39 obviates the need for a ring seal or other packing between the valve and its supporting post. The factor of friction in motion of the valve, which makes the opening pressure of the valve unpredictable and the closing pressure higher than the opening pressure, thus is eliminated.

Another feature has to do with the mounting of all moving parts of the unit on the sleeve 43 instead of directly upon the tie shaft 14. This adds to the convenience of initial assembly since the plate 31, sleeve 43, valve 46 and associated parts, and screen 54 and associated parts may be brought together as a sub-assembly for mounting on the tie shaft 14 as a unit. Further, use of the sleeve 43 permits the sub-assembly of which it is a part to be stationed anywhere along the length of the tie shaft 14 according to the height of the filter element. The opening pressures of the valve 46 and screen 54 thus are independent of the height of the filter element which would determine the initial compression of the springs 51 and 58 were the valve and screen mounted directly upon the tie shaft 14.

It is to be understood, however, that insofar as broad functional features of the invention are concerned, the valve and screen may be considered as being mounted directly upon the tie shaft.

Still another feature resides in the mounting of the screen 54 so that it will relieve itself under a predetermined pressure differential. Advantages of space, weight and cost are gained over more obvious by-pass devices such as a fixed screen and separate relief valve.

What is claimed is:

1. A fuel filter unit for use in systems flowing fluid under pressure, comprising a two part housing made up of a pair of cup shaped elements arranged with their edges in abutting relationship, a tie shaft extending internally between said elements and anchored in the bottoms thereof, a cylindrical filter seating in the bottom of one of said elements and defining externally thereof a chamber in said housing, a plate closing the opposite end of said filter and defining in conjunction therewith a chamber internally of said filter, inlet and outlet openings in said housing communicating respectively with said external and internal chambers, a circular series of openings in said plate for the passage of fluid from said inlet to said outlet in by-passing relation to said filter, concentric projections on the underside of said plate defining a valve seat, a disc-like valve slidably mounted on said tie shaft and engageable with said valve seat to close said openings, a sack-shaped screen arranged in surrounding relation to said shaft and said valve, a sleeve set in the closed end of said screen and slidably mounted on said tie shaft, the opposite or open end of said screen having a seat on the underside of said plate in outwardly spaced relation to the series of openings therein, and spring mountings for said valve and for said screen on said shaft, permitting motion thereof away from said plate in response to a predetermined rise in the pressure drop between said inlet and said outlet.

2. A filter unit according to claim 1, characterized by a sleeve surrounding said tie shaft and formed with a flange overlying the outer surface of said plate, the reactant force of said spring mounting being exerted upon said bushing in a manner to press said plate upon said filter.

3. A filter unit for use in systems flowing fluid under pressure, comprising a two part housing made up of a pair of cup-shaped elements inversely arranged with their edges in abutting relationship, a tie shaft extending internally between said elements and anchored in the bottoms thereof, a cylindrical filter seating in the bottom of one of said elements and defining externally thereof a chamber in said housing, a plate closing the opposite end of said filter and defining in conjunction therewith a chamber internally of said filter, inlet and outlet openings in said housing communicating respectively with said external and internal chambers, a circular series of openings in said plate for the passage of fluid from said inlet to said outlet in by-passing relation to said filter, spaced concentric rings on the underside of said plate defining a valve seat, a disc-like valve underlying said concentric rings and arranged to seat thereon, a sack-shaped screen in surrounding relation to said valve, the open end of said screen engaging the underside of said plate outward of said concentric rings, a sleeve slidably mounted on said tie shaft and fixed relatively to said plate, said valve and the closed end of said screen being slidably mounted on said sleeve, and individual resilient connections between said sleeve and said valve and between said sleeve and said screen urging said valve and said screen toward contact with said plate, said connections yielding successively to a predetermined high pressure differential between said inlet and said outlet as may be caused by clogging of said filter and by clogging of said screen.

4. A filter unit for use in systems flowing fluid under pressure, comprising a housing, a shaft rigidly mounted in said housing between opposing walls thereof, a cylindrical filter in said housing seated on one of said walls in surrounding relation to said shaft, a plate closing the open end of said filter and having a central opening therein through which said shaft is passed, a sleeve surmounting said shaft and extending through the central opening in said plate, a flange on the outer end of said sleeve turned over upon said plate, a lock-nut on said shaft screwed down upon said flange to fix said sleeve relatively to said plate, a circular series of ports in said plate, a disc-like valve slidably mounted on said sleeve and engageable with the underside of said plate to close said ports, a screen slidably mounted on said sleeve beneath said valve and engageable with the underside of said plate outwardly of said series of ports, individual springs urging said valve and said screen to seats on the underside of said plate and yielding under predetermined pressure differentials applied thereacross, an inlet for the fluid under pressure opening into said housing externally of said filter, and an outlet communicating with the space enclosed by said filter.

5. A filter unit according to claim 4, characterized by individual mounting means for said valve and screen springs on said sleeve, the assembly of parts comprising said sleeve, said plate, said valve, said screen and said springs comprising a unitary sub-assembly constructed and arranged to be mounted upon said shaft in cooperative relation with the filter without alteration in the initial tension of the springs irrespective of the height or length of the filter.

MILES H. HAMILTON.

REFERENCES CITED

The following references are of record in the file of this patent:

UNITED STATES PATENTS

| Number | Name | Date |
|---|---|---|
| 511,798 | Rankine | Jan. 2, 1894 |
| 2,017,350 | Morgan | Oct. 15, 1935 |
| 2,389,814 | Pond et al. | Nov. 27, 1945 |

FOREIGN PATENTS

| Number | Country | Date |
|---|---|---|
| 520,779 | Great Britain | May 3, 1940 |